United States Patent [19]

Wyczalek et al.

[11] 3,983,847
[45] Oct. 5, 1976

[54] JET IGNITION ENGINE WITH PRECHAMBER FUEL INJECTION

[75] Inventors: Floyd A. Wyczalek, Birmingham; Stanley Maksymiuk, Jr., Utica; John L. Harned, Grosse Pointe Woods, all of Mich.; Jerry R. Blevins, Knoxville, Tenn.

[73] Assignee: General Motors Corporation, Detroit, Mich.

[22] Filed: Feb. 10, 1975

[21] Appl. No.: 548,795

[52] U.S. Cl. .......................... 123/32 SP; 123/32 SA
[51] Int. Cl.² .......................................... F02B 19/10
[58] Field of Search ......... 123/32 SP, 32 ST, 191 S, 123/191 SP, 143 B, 32 SA

[56] References Cited
UNITED STATES PATENTS

| | | | |
|---|---|---|---|
| 1,616,157 | 2/1927 | Werner | 123/32 SP |
| 2,758,576 | 8/1956 | Schlamann | 123/32 SP |
| 3,661,125 | 5/1972 | Stumpfig | 123/32 SP |
| 3,824,965 | 7/1974 | Clawson | 123/32 SP |
| 3,878,826 | 4/1975 | Date | 123/32 SP |

Primary Examiner—Charles J. Myhre
Assistant Examiner—Ronald B. Cox
Attorney, Agent, or Firm—Robert J. Outland

[57] ABSTRACT

A jet ignition engine, of the type in which lean mixtures in the main combustion chambers are ignited by flame jets formed by combustion of rich mixtures in adjacent small auxiliary precombustion or ignition chambers connected with the main chambers by restricted orifices, wherein the engine is provided with a main fuel system for supplying lean mixtures to the main chambers and a supplemental fuel injection system for adding fuel to the auxiliary prechambers to augment lean mixtures delivered from the main chambers and form the rich prechamber ignition charges. The simplified injection system injects fuel at low pressure during the piston exhaust strokes through timed injection valves and nozzles. Each fuel stream is directed to engage an extended spark plug electrode that forms an atomizing projection in the prechamber to break up the fuel stream, directing droplets to prechamber walls, formed by an insulated cup, for vaporization. Optionally, a constant injection period may be maintained for all operating conditions by relating the injection pressure, orifice size and timing to the range of throttle openings so as to maintain the prechamber air-fuel ratio within a range of from about 8:1 to 12:1 and the main chamber air-fuel ratio within a range of from about 16:1 to 26:1.

3 Claims, 4 Drawing Figures

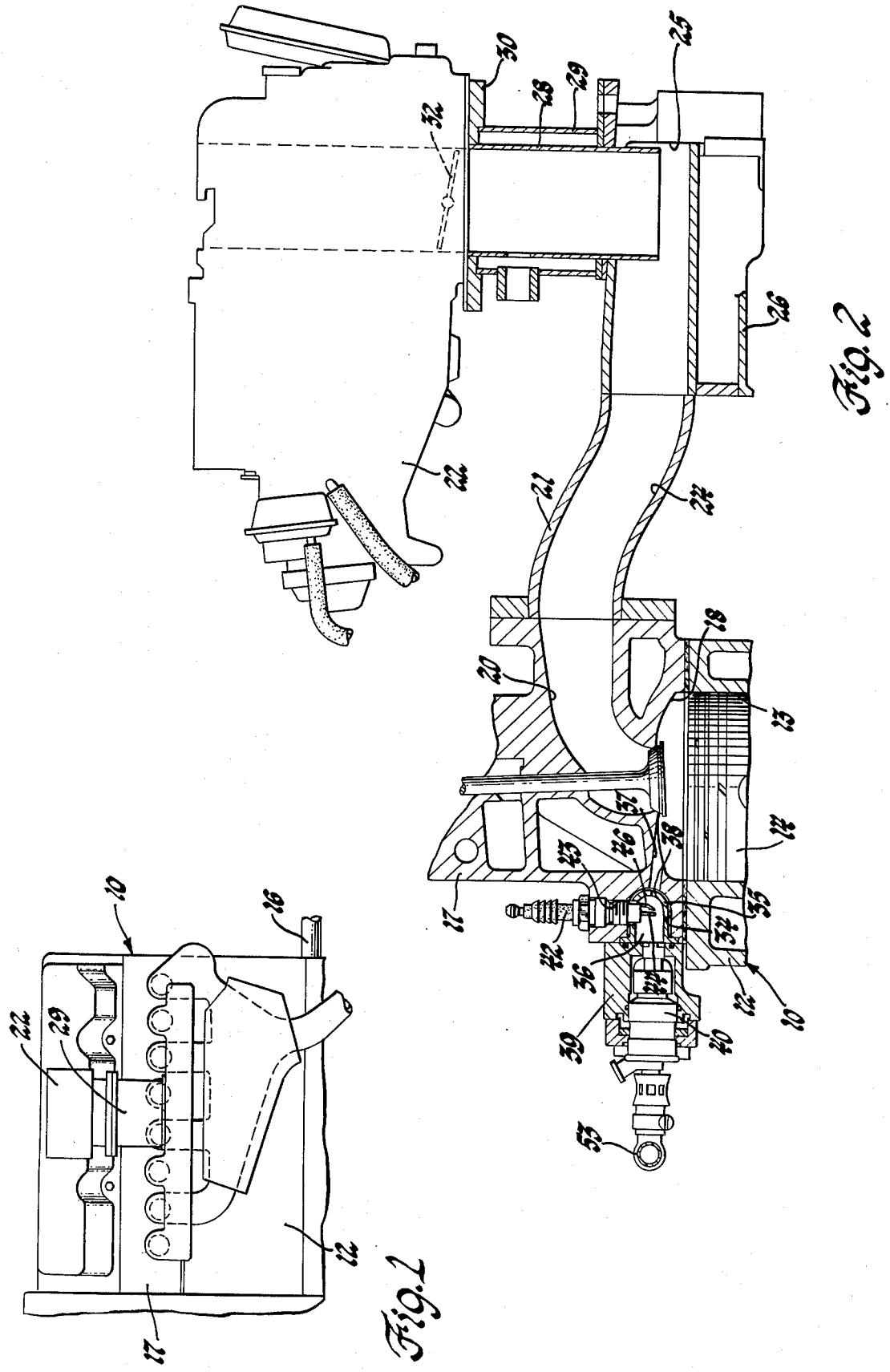

JET IGNITION ENGINE WITH PRECHAMBER FUEL INJECTION

BACKGROUND OF THE INVENTION

This invention relates to internal combustion engines and more particularly to so-called jet or torch ignition engines having a main combustion chamber in which lean air-fuel mixtures are ignited by flame jets caused by combustion of rich air-fuel mixtures in a connecting prechamber or auxiliary ignition chamber that forms a relatively small percentage (i.e. less than 10 percent) of the total clearance volume.

It is known in the art to provide a jet ignition engine with supplemental fuel injection means for supplying fuel directly to the auxiliary ignition chambers to mix with lean air-fuel mixtures admitted from connecting main chambers, thus forming rich mixtures easily ignitable by a spark plug. It has been further suggested that optimum ignition of lean mixtures in the main combustion chambers is obtained when prechamber air-fuel ratios are maintained within a range of from about 8:1 to 12:1 at the time of ignition.

SUMMARY OF THE INVENTION

The present invention comprises a jet ignition engine arrangement in which a simplified fuel injection system is provided that operates in relation to the load control and lean fuel mixture supply systems for the main combustion chambers to provide the desired air-fuel ratios in the auxiliary ignition chambers under varying load conditions. The invention also includes atomizing means in each prechamber, preferably formed by an extended electrode of the spark plug, which breaks up the small fuel charges introduced into the prechamber, directing droplets to the hot walls of an insulated cup insert for vaporizing the fuel.

The fuel injection system utilizes low fuel injection pressures and is controlled by injection valves that are open for predetermined periods during the exhaust strokes of their respective pistons to maintain relatively constant differential pressures for fuel injection under all operating conditions, as well as to provide adequate time during the subsequent intake and compression strokes for vaporization of the injected fuel.

In one embodiment of the invention, the period of injection is held constant under all operating conditions. If desired, however, the injection period may be varied as a function of engine load and/or operating temperature to maintain closer control of prechamber air-fuel ratios at the expense of increased fuel system complexity.

These and other features of the invention will be more fully understood from the following description of a preferred embodiment, taken together with the accompanying drawings.

BRIEF DESCRIPTION OF THE DRAWINGS

In the drawings:

FIG. 1 is a side elevational view of an internal combustion engine formed in accordance with the invention;

FIG. 2 is a fragmentary cross-sectional view of the engine of FIG. 1 showing details of the induction and injection systems;

DESCRIPTION OF THE ILLUSTRATED EMBODIMENT

Figure 3:
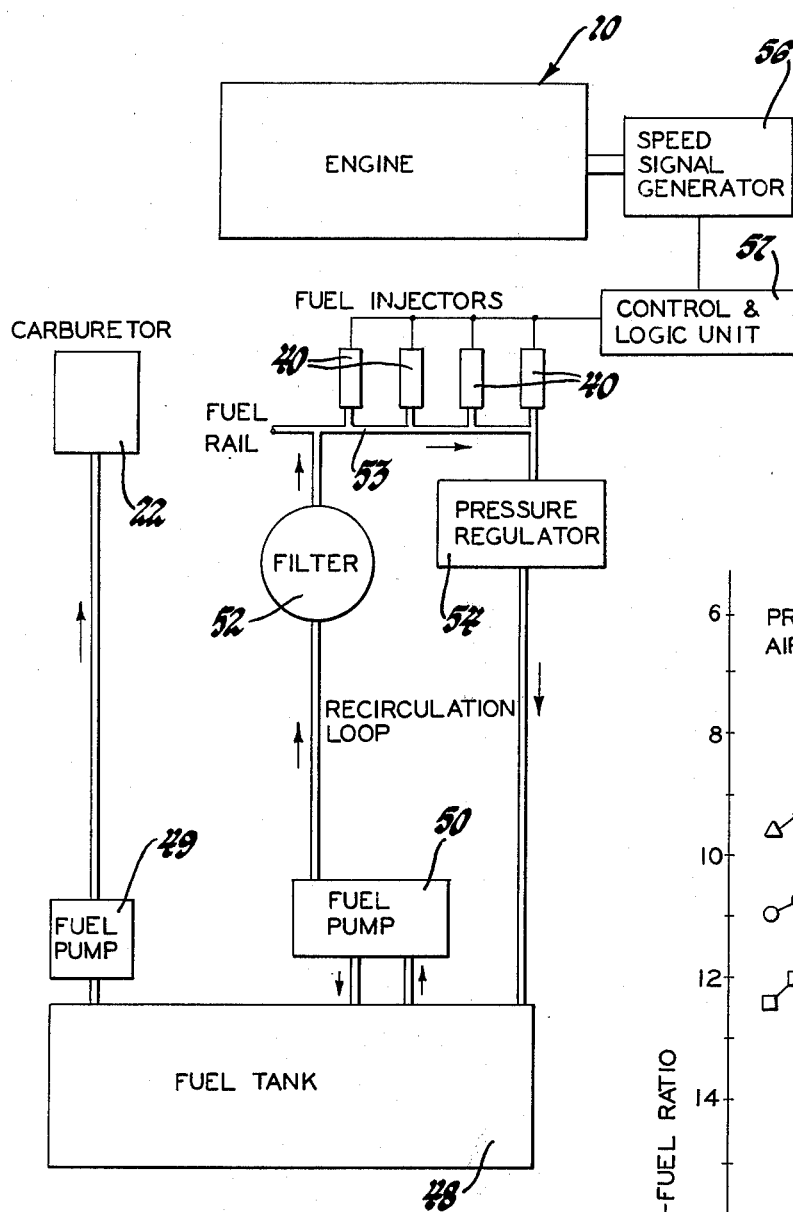
FIG. 3 is a diagrammatic view illustrating the relationships of portions of the fuel supply and control systems.

Referring now to the drawings in greater detail, numeral 10 generally indicates an internal combustion engine of the four stroke cycle type. The engine is of generally conventional configuration and includes a cylinder block 12 having a plurality of aligned cylinders 13, only one being shown. The cylinders mount reciprocating pistons 14 connected in conventional manner to an output shaft 16 for the delivery of power from the engine.

Engine 10 further includes a cylinder head 17 mounted on the cylinder block and closing the ends of the cylinders 13 to define combustion chambers 18 that vary in volume upon reciprocation of their respective pistons 14. The cylinder head includes an intake passage 20 leading to each combustion chamber 18, as well as the usual exhaust passages (not shown). The intake passages 20 open through one side of the head where they connect with an induction system including an intake manifold 21 mounted on the cylinder head, and a carburetor 22 mounted on the manifold.

The intake manifold includes induction passages 24 that extend laterally between the cylinder head intake passages 20 and a water jacketed plenum 25 in the manifold. Plenum 25 is heated by engine water supplied to a surrounding water jacket 26. A riser or induction tube portion 28 extends vertically upwardly from the plenum 25 and also includes a water jacket 29 for supplying engine heat thereto.

A mounting boss 30 at the top of the riser 28 provides a base on which the carburetor 22 is mounted. The carburetor includes the usual throttle 32 and is arranged to supply lean air-fuel mixtures at predetermined air-fuel ratios to the riser for distribution through the intake manifold to the engine combustion chambers 18.

Along the side of the cylinder head 17, opposite from the side on which the intake manifold 21 is mounted, are provided a plurality of recesses 34, one located next to and associated with each combustion chamber 18. Within the recesses 34 are small cup-shaped inserts 35 which define interiorly thereof small auxiliary ignition or precombustion chambers 36. The inserts are preferably spaced slightly from the walls of the recesses to provide an insulating air gap therebetween, so as to retain heat in the cup walls. Each recess 34 is connected with its respective combustion chamber by an opening or passage 37 which may comprise a restrictive orifice. A connecting orifice or opening 38 is provided in each cup wall to connect the prechamber 36 with the orifice 37 and the combustion chamber. Preferably, the opening 38 is smaller than passage 37 and comprises the primary restriction to flow between the chambers. If desired, the cup body may form part of the main combustion chamber wall, eliminating the connecting passage 37.

Preferably, the size of the prechamber within the cup is about 4 to 5 percent, and may range from 3 to 7 percent, of the total clearance volume defined by the prechamber, the connecting orifices and main combustion chamber when the piston is at top dead center. Below 3 percent the ignition energy in the jet would be excessively reduced, while above 7 percent, increased pumping losses adversely affect engine efficiency. The best ratio for the volume of the prechamber cavity to the size of the cup orifice 38 is presently considered to be in the range of about 15:20 cubic inches per square inch; however, this range could be extended in either direction without departing from the invention.

The outer sides of the recesses 34 are closed by a mounting rail 39 which is secured to the cylinder head and carries a plurality of "electronic" fuel injectors 40. Each injector has an electrically actuated injection valve that controls the flow of fuel to a nozzle that opens into its respective prechamber 36.

Each prechamber is also provided with a spark plug 42, secured in an opening 43 in the cylinder head.

The spark plug has an extended center electrode 44 disposed within the prechamber and in the path of the fuel sprayed by the respective fuel injector. In this way the center electrode acts as an atomizing target, breaking up the larger fuel droplets into smaller ones and directing them onto the warm walls of the prechamber cup for vaporization. The spark gap for the spark plug is formed between the center electrode and a ground electrode 46 which is positioned on the opposite side of the center electrode from the fuel injector so as to be shielded from the direct impingement of fuel spray.

FIG. 3 shows schematically the fuel supply and control system for the engine. Fuel from fuel tank 48 is supplied to the carburetor 22 by a fuel pump 49 in conventional manner.

The fuel injectors 40 are supplied with fuel by a system that includes a second fuel pump 50, which delivers fuel through a filter 52 to a fuel rail 53 that connects with the various injectors. Pressure in the system is controlled by a pressure regulator 54 through which excess fuel is returned to the tank.

A control system utilizing simplified conventional control concepts is also provided for controlling the duration and timing of the fuel injection periods. The system includes a speed signal generator 56 which is connected to the engine and transmits an engine speed and timing related signal pulse to a control and logic unit 57. The latter unit controls the timing and duration of the injection periods and includes the capability for manual adjustment of the length of injection, the intention being that the injection period will remain fixed under varying engine operating conditions once a specific setting has been established. It would be possible, however, as has been done in commercially available fuel injection systems, to vary the injection period as a function of engine load or manifold pressure, engine speed and/or engine temperature in order to more closely maintain engine air-fuel ratios in the desired ranges.

Operation of the engine and fuel system as so far described is as follows:

The engine operates on the conventional four stroke cycle including intake, compression, expansion and exhaust strokes, with combustion beginning near the end of the compression stroke and continuing partially into the expansion stroke. During the intake stroke of each cylinder, a charge of lean air-fuel mixture is inducted into its combustion chamber from the induction system. This mixture is supplied by the carburetor in a predetermined range of air-fuel ratios which preferably approximates 24:1 for normal operation under load, but is reduced to about 18:1 when operating at or near maximum power. However, extended lean operation with main chamber air-fuel ratios from about 16:1 to 26:1 are possible with the present invention.

During the subsequent compression stroke, the inducted mixture is compressed in the combustion chamber and part of it is forced through the connecting orifices into the auxiliary ignition or precombustion chamber 36 where it mixes with residual exhaust products and previously injected fuel. The added fuel richens the air-fuel mixture so that the prechamber mixture is controlled preferably in the range between 8 and 12:1.

Near the end of the compression stroke, the spark plug ignites the rich mixture in the prechamber and the resultant combustion expands and forces burned and burning mixture through the orifice into the main chamber. This creates a jet of flaming products that ignites and causes burning of the lean mixture in the main chamber. During the expansion stroke, the engine develops power by expanding the burned gases which are then swept from the cylinder during upward motion of the piston on the exhaust stroke.

Experiments have shown that a low pressure fuel injection system may be satisfactorily applied and practically utilized in an engine of this type by providing for injection of the necessary auxiliary fuel to the prechamber to occur during the piston exhaust stroke of its respective cylinder. Since the amounts of fuel to be injected are merely for the purpose of enriching the lean mixture provided by the carburetor sufficiently to provide a mixture slightly rich of stoichiometric (i.e. having an air-fuel ratio less than about 15:1), it is desirable for control purposes to keep the fuel pressure as low as possible.

In a specific instance using injector orifices of 0.020 inches, a fuel pressure of only 7 psi supplied the required 1 microliter of fuel per cylinder each engine cycle necessary for this purpose. Injection on the exhaust stroke has the advantage that the cylinder pressure during this phase of the cycle is relatively constant, being approximately equal to the engine exhaust pressure. This contrasts significantly with the variation in pressures that occurs during, for example, the intake stroke where the cylinder pressure is substantially reduced as the engine is throttled. In addition, the pressure on the exhaust stroke is significantly lower than that which occurs during the engine compression stroke. Thus, injection on the exhaust stroke permits the use of relatively low fuel injection pressures while maintaining a less variable back pressure than on the intake stroke, permitting the engine to be operated with a fixed duration of injection under varying operating conditions, if so desired.

Another advantage of injecting on the exhaust stroke is that it gives a maximum period of time for vaporization of fuel in the prechamber before ignition occurs. During injection the fuel is sprayed on an atomizer in each prechamber which, in this case, is the extended electrode 44 of the spark plug. Impingement on the electrode breaks up the fuel spray into small droplets which are directed against the walls of the prechamber. Since these walls are formed by an insulated cup, they remain warm and cause the fuel droplets to be evaporated, during the intake and compression strokes following injection, thus providing a well vaporized mixture for ignition.

Figure 4:
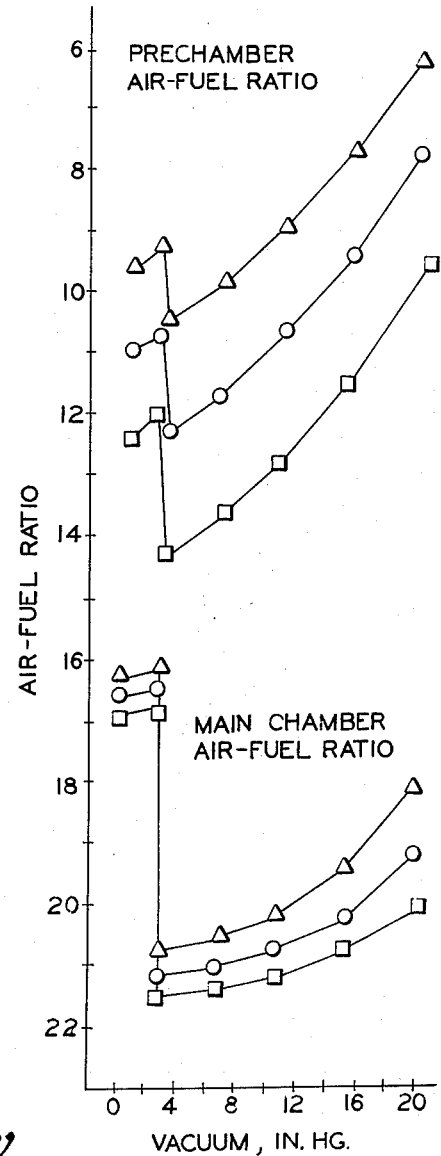
FIG. 4 is a graphical illustration showing the effects of certain operating variables on engine air-fuel ratios at differing loads with a constant fuel injection period.

FIG. 4 graphically illustrates the results of tests showing the effects on air-fuel ratio in the prechamber and main chamber of variations in engine load, as measured by manifold vacuum, and the amount of prechamber fuel injected as determined by changes in orifice size. These tests were accomplished with a fixed duration of injection under all operating conditions. As may be seen, both the main chamber and prechamber air-fuel ratios are reduced as a function of load when the carburetor is operating in its lean mode. Selection of the intermediate one of the orifices tested permits maintaining the main chamber air-fuel ratio between 19 and 22:1, while the prechamber air-fuel ratio varies between about 8 and 12:1 over the range of engine operation. The main chamber ratio is further enriched at maximum output by a reduction in the carbureted air-fuel ratio to obtain additional power.

The results of these tests show that it is possible to operate practically an engine of this type with a simplified fuel injection system having a constant duration of injection. However, it would also be possible, if desired, to control the air-fuel ratios more closely by providing a modified fuel injection system which varies the duration of injection as a function of engine load, speed or temperature or a combination of these factors.

As used in the claims, the word "small" as applied to an ignition chamber indicates a chamber having a volume not greater than about 7 percent of the total clearance volume of the main and auxiliary chambers and their connecting orifices when the respective piston is at its top dead center position. As applied to quantities of fuel injected into the ignition chambers, the word "small" indicates an amount not greater than about 10 percent of the total fuel supplied to the engine.

While the present disclosure has been limited to a specific embodiment of blind chamber type jet ignition engine for operation at lean air-fuel ratios, it should be understood that numerous changes may be made within the scope of the inventive concepts disclosed. Accordingly, it is intended that the invention not be limited except by the language of the following claims.

What is claimed is:

1. The combination in an internal combustion engine of
    means defining a closed end cylinder,
    a piston reciprocable in said cylinder and defining therewith a variable volume main combustion chamber,
    inlet and exhaust means connecting with said combustion chamber and respectively operable to admit fluids to and exhaust fluids from said combustion chamber,
    supply means operable to provide lean air-fuel mixtures to said inlet means for induction into said combustion chamber on the piston intake strokes,
    means defining a small closed ignition chamber adjacent said combustion chamber and connected therewith by a restricted orifice which constitutes the only opening for admission of air to and exhaust of air from said ignition chamber,
    fuel injection means including an injector mounted to spray supplemental fuel directly into said ignition chamber in quantities small in relation to those provided to said combustion chamber by said supply means, and timing means operable to actuate said injector once each cycle and only during the exhaust stroke of said engine piston to admit such supplemental fuel to said ignition chamber while the fuel injection pressure is opposed only by engine exhaust back pressure and to provide time for vaporization of the fuel during the succeeding intake stroke, the subsequent compression stroke of said piston forcing lean mixture into the ignition chamber from the main chamber to mix with the added fuel and form a rich air-fuel mixture in the ignition chamber,
    atomizing means projecting from the wall of said ignition chamber and positioned in the path of the fuel spray to intercept and break up the supply of fuel from said fuel injection means and to direct the atomized droplets against the interior of said ignition chamber for vaporization, and
    spark ignition means in said ignition chamber and operable to ignite the rich mixture therein near the ends of the piston compression strokes, the resulting combustion forcing jets of burning products through said orifice to ignite lean mixtures in the main combustion chamber.

2. The combination in an internal combustion engine of
    means defining a closed end cylinder,
    a piston reciprocable in said cylinder and defining therewith a variable volume main combustion chamber,
    inlet and exhaust means connecting with said combustion chamber and respectively operable to admit fluids to and exhaust fluids from said combustion chamber,
    supply means operable to provide lean air-fuel mixtures to said inlet means for induction into said combustion chamber on the piston intake strokes,
    means defining a small closed ignition chamber adjacent said combustion chamber and connected therewith by a restricted orifice which constitutes the only opening for admission of air to and exhaust of air from said ignition chamber, said ignition chamber comprising a heat insulated cup for heating and vaporizing liquid fuel droplets impinging thereon,
    fuel injection means including an injector mounted to spray supplemental fuel directly into said ignition chamber in quantities small in relation to those provided to said combustion chamber by said supply means, means providing a fixed injection period for operation of said injector on each engine cycle and timing means operable to actuate said injector once each cycle and only during the exhaust stroke of said engine piston to admit such supplemental fuel to said ignition chamber while the fuel injection pressure is opposed only by engine exhaust back pressure and to provide time for vaporization of the fuel during the succeeding intake stroke, the subsequent compression stroke of said piston forcing lean mixture into the ignition chamber from the main chamber to mix with the added fuel and form a rich air-fuel mixture in the ignition chamber,
    atomizing means projecting from the wall of said ignition chamber and positioned in the path of the fuel spray to intercept and break up the supply of fuel from said fuel injection means and to direct the atomized droplets against the interior of said ignition chamber cup for vaporization, and
    spark ignition means in said ignition chamber and operable to ignite the rich mixture therein near the ends of the piston compression strokes, the resulting combustion forcing jets of burning products through said orifice to ignite lean mixtures in the main combustion chamber.

3. The combination in an internal combustion engine of
- means defining a plurality of closed end cylinders,
- pistons reciprocable in said cylinders and defining therewith variable volume main combustion chambers,
- inlet and exhaust ports connecting with said combustion chambers and valves controlling said ports and respectively operable to admit fluids to and exhaust fluids from said combustion chambers through said ports,
- a heated manifold connected with said inlet ports,
- a carburetor mounted on said manifold and operable to provide a lean air-fuel mixture thereto for distribution to said inlet ports for induction into said combustion chambers on their respective piston intake strokes,
- means defining small closed ignition chambers adjacent said main combustion chambers and connected therewith by restricted orifices which constitute the only openings for admission of air to and exhaust of air from said ignition chambers, said ignition chambers comprising heat insulated cups for heating and vaporizing liquid fuel droplets impinging thereon,
- fuel injection means including injectors mounted to spray supplemental fuel at low pressures directly into said ignition chambers in quantities small in relation to those provided to said combustion chambers by said carburetor, means providing fixed injection period for operation of said injectors on each engine cycle, regardless of engine speed or load, and timing means operable to actuate said injectors once each cycle during the exhaust strokes of their respective engine pistons to admit such supplemental fuel to said ignition chambers while the low fuel injection pressure is opposed only by engine exhaust back pressure and to provide for vaporization of the fuel during extended periods, including the succeeding intake and compression strokes, the subsequent compression strokes of said pistons forcing lean mixtures into the ignition chambers from their associated main chambers to mix with the added supplemental fuel, the amounts of fuel added being selected to form rich combustible air-fuel mixtures in the ignition chambers when mixed with such lean mixtures, and
- spark plugs in said ignition chambers and operable to ignite the rich mixtures therein near the ends of their respective piston compression strokes, the resulting combustion forcing jets of burning products through said orifice to ignite lean mixtures in the main combustion chambers, said spark plugs having protruding electrodes extending across the paths of the fuel sprayed into said ignition chambers by said injectors, said electrodes acting as atomizing means to intercept and atomize the fuel spray and direct the atomized droplets against the interior of said cup for vaporization.

* * * * *